United States Patent
Parkhurst et al.

(10) Patent No.: US 8,570,593 B2
(45) Date of Patent: Oct. 29, 2013

(54) PROCESS, A COMPUTER AND A COMPUTER PROGRAM FOR PROCESSING DOCUMENT DATA HAVING COLOR DATA

(75) Inventors: Anthony Parkhurst, Munich (DE); Jose La Rosa Ducato, Erding (DE); Werner Engrocks, Poing (DE)

(73) Assignee: Océ Printing Systems GmbH, Poing (DE)

( * ) Notice: Subject to any disclaimer, the term of this patent is extended or adjusted under 35 U.S.C. 154(b) by 886 days.

(21) Appl. No.: 12/703,940

(22) Filed: Feb. 11, 2010

(65) Prior Publication Data

US 2010/0202003 A1 Aug. 12, 2010

(30) Foreign Application Priority Data

Feb. 12, 2009 (DE) .................. 10 2009 008 681

(51) Int. Cl.
| | | |
|---|---|---|
| H04N 1/60 | (2006.01) | |
| H04N 1/62 | (2006.01) | |
| H04N 1/56 | (2006.01) | |
| H04N 1/54 | (2006.01) | |
| G06K 15/02 | (2006.01) | |
| G06F 3/048 | (2013.01) | |

(52) U.S. Cl.
USPC ............. 358/1.9; 358/2.1; 358/500; 358/501; 358/518; 358/523; 358/524; 358/531; 358/536; 358/538; 358/539; 358/401; 382/162; 382/166; 382/167; 715/763

(58) Field of Classification Search
None
See application file for complete search history.

(56) References Cited

U.S. PATENT DOCUMENTS

| | | | |
|---|---|---|---|
| 6,252,676 B1 * | 6/2001 | Azima et al. .................. 358/1.9 |
| 6,781,720 B1 * | 8/2004 | Klassen ....................... 358/3.27 |
| 7,110,147 B1 * | 9/2006 | Hayama et al. ............... 358/464 |
| 7,298,516 B2 | 11/2007 | Herr | |
| 2004/0036902 A1 | 2/2004 | Ducato | |
| 2004/0169889 A1 * | 9/2004 | Sawada .......................... 358/2.1 |
| 2006/0007496 A1 * | 1/2006 | McElvain .................... 358/3.27 |
| 2006/0050288 A1 * | 3/2006 | Aschenbrenner et al. ..... 358/1.9 |
| 2006/0170944 A1 * | 8/2006 | Arps et al. .................... 358/1.13 |
| 2007/0008560 A1 * | 1/2007 | Eschbach ........................ 358/1.9 |
| 2007/0176944 A1 * | 8/2007 | Brown et al. .................. 345/592 |
| 2007/0206853 A1 * | 9/2007 | Kim et al. ...................... 382/167 |
| 2009/0009779 A1 * | 1/2009 | Do .................................. 358/1.9 |

FOREIGN PATENT DOCUMENTS

| | | |
|---|---|---|
| DE | 10 2006 002 886 A1 | 7/2007 |
| WO | WO 01/78375 | 10/2001 |
| WO | WO 2007/087935 A2 | 8/2007 |

OTHER PUBLICATIONS

Mixed Object Document Content Architecture Reference—Data Stream Object Architectures—May 2006—IBM.

\* cited by examiner

*Primary Examiner* — King Poon
*Assistant Examiner* — Beniyam Menberu
(74) *Attorney, Agent, or Firm* — Schiff Hardin LLP

(57) ABSTRACT

In a preflight process for digital print systems, color data from print data are analyzed and the results presented in a report. The color data are individually altered in regard to not only a color profile, in which they are encoded, but also in regard to their color values, using a graphic user interface. Results of the alterations are displayed using corresponding screened document pages.

12 Claims, 6 Drawing Sheets

PROCESS, A COMPUTER AND A COMPUTER PROGRAM FOR PROCESSING DOCUMENT DATA HAVING COLOR DATA

BACKGROUND

The preferred embodiment is comprised of a process, a computer and a computer program for processing document data containing color data.

The preferred embodiment is concerned particularly with the processing of such document data for optimal output with printing systems.

With the sending of document data to printing systems, the problem of colors being reproduced differently by printing systems still occurs frequently, although in the meantime standardized color systems have been developed, and conversion algorithms have been established between the color profiles. The variety and complexity in the production of document file streams that contain color data as well as with the processing and finally sending to an output device, still leaves however, several unresolved difficulties.

A further problem with the processing of document file streams containing color data is that the color processing is relatively complex and computing intensive. In particular, with the outputting of very large print files from data bases of large computers, having for example several thousand to a hundred thousand individual pages, conversions in the relevant processing steps, for example in a halftone process, may result in significant time-lags. These can be so large that, for example, a subsequent digital high performance printer must be stopped until the preprocessing of the data is complete. Downtimes of this type may result in production losses and printed documents, as well as in additional expenditure required to re-start the device. As a result, it is of some concern that the processing of document data of this type be optimized in this respect, in order that the printing procedure processing steps may be carried out as quickly as possible.

For the above mentioned purposes so-called preflight processes have been developed, whereby the print data has already been checked in an earlier phase with a limited number of checking criteria, in order that any problems may be noted early on. Problems of this type may be, for example, that the color data is in a color profile which is unsuited to the subsequent processing steps, for example, a color profile which is not supported by the subsequent processing steps, or can only be processed in a manner which is relatively slow. Another problem may be that the relative color profile can only be outputted by the output device more slowly.

A further function of preflight processing is to check for consistency in the input data and to, for example, determine inconsistencies which occur as a result of the data being generated by several computer programs, which in the end results in unnecessarily large file sizes or contradictions.

A preflight process contained in U.S. Pat. No. 7,298,516 is known.

A group of data streams have been established in high performance digital printing, whereby large quantities of print data may be very efficiently processed. A series of data streams are specified under the term Advanced Function Presentation (AFP) which are optimized for the transference between various processing steps, e.g. the format Mixed Object Document Content Architecture (MO: DCA) for the transference between computer systems, and the format Intelligent Printer Data Stream (IPDS) for the transference between a host computer or a print server to a printer.

A process is known from US 2004/0036902 A1 in which the AFP data can be analyzed, whereby various data groups may be extracted, or rather, created from the relevant objects in the data stream, such as index data, resource data and document data.

A process is known from WO 01/78375 A1 with which AFP resources concerning color data can be processed. In this process, so-called color conversion tables, in particular, are processed by a computer program.

A process and a system is known of from DE 10 2006 002 886 A1 whereby the color data of an AFP data stream are identifiable. With this, the respective references for numerous color profiles may be obtained, such as so-called full color profiles, like the color profile CMYK (Cyan, Magenta, Yellow, Key), the color profile LAB (Luminance, color axis A from green to red and color axis B from blue to yellow), the color profile RGB (Red, Green, Blue). The references may also refer to other color profiles, such as the color profile HLC (Highlight Color, which means an individual color profile with given colors) or the color profile OCA (Object Content Architecture), which, for example, is defined in the AFP specification Mixed Object Document Content Architecture Reference, $8^{th}$ edition (May, 2006), published by the International Business Machines Corp. listed under the no. SC31-6802-07, on pages 515-516.

The above named publications are hereby incorporated by reference in the present description as references.

SUMMARY

It is an object to provide a process for processing and outputting document data containing many pages and containing color data, whereby it is possible to quickly search and correct any color inconsistencies, in order to provide for a fast and accurate outputting of the document data.

In a preflight process for digital print systems, color data from print data are analyzed and results presented in a report. The color data are individually altered with respect to not only a color profile in which they are encoded, but also with respect to their color values, using a graphical user interface. Results of the alterations are displayed using corresponding screened document pages.

DESCRIPTION OF THE PREFERRED EMBODIMENT

Figure 1:
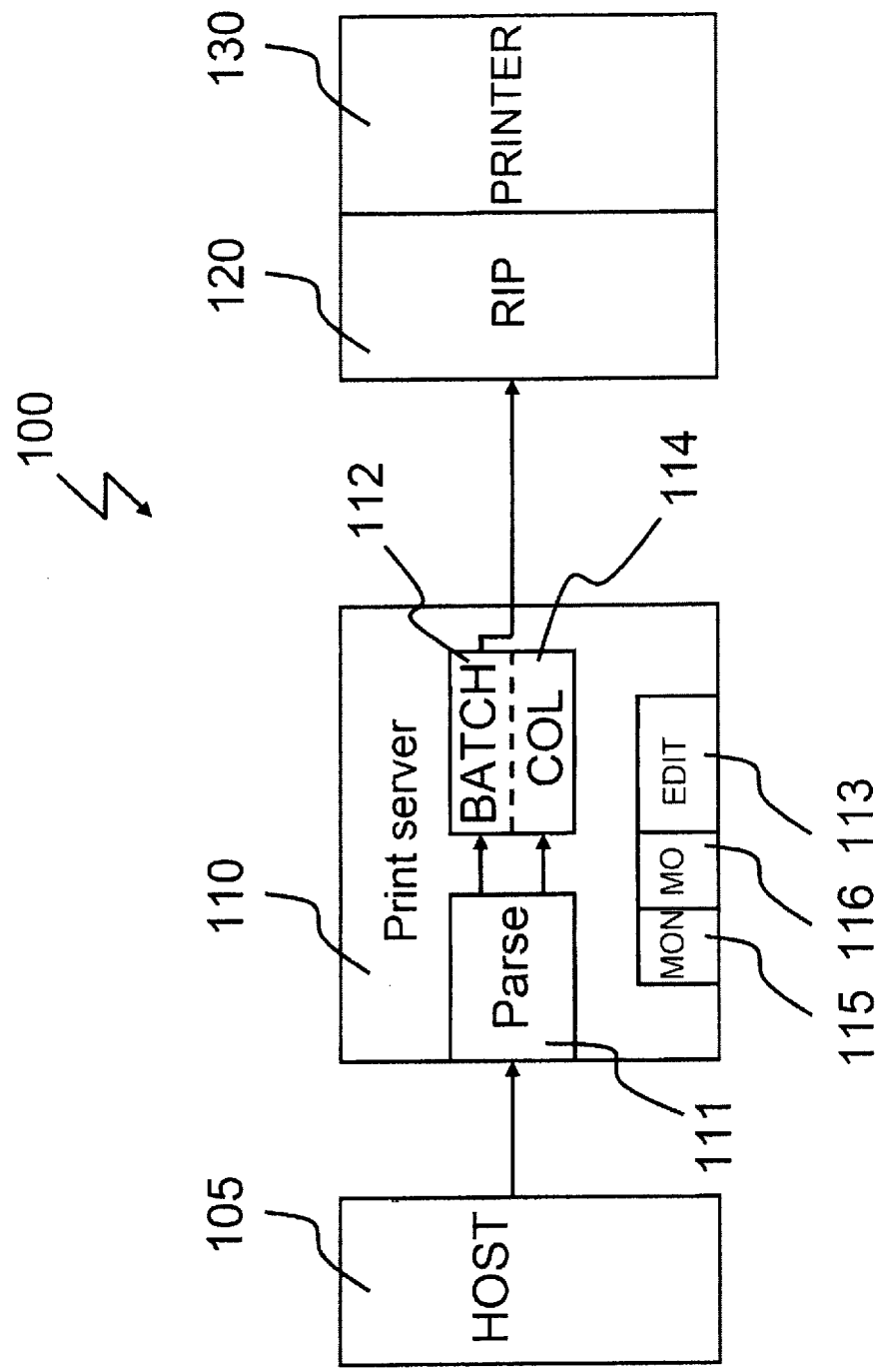
FIG. 1 shows a digital printing system.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated devices and such further applications of the principles of the invention as illustrated as would normally occur to one skilled in the art to which the invention relates are included.

With the preferred embodiment, a process is provided for processing document data which contain many pages, and which contain color data in the document data, which are encoded in a color profile and subsequently are characterized as input color data. For this, the input color data are able to be processed, which are encoded in any of numerous possible color profiles. Furthermore, the relevant color elements of the input color data for a portion of the input color data are displayed on a display device. In addition, for at least one of the displayed color elements a color conversion is carried out, thereby generating a conversion rule. The color elements of the relevant input color data is converted in the document data according to the conversion rule, thereby generating the corresponding output color data. The color profile, in which the output color data are encoded, is selected from numerous predefined color profiles. At least a portion of the document data is screened on a page-by-page basis with the output color data, and the screened data is displayed on the display device.

The preferred embodiment is based on the realization that with processing print data in a digital production printing system for an output of print data, it is advantageous to subject the color data to a special examination and processing from the input of the print data to the point where the printing has been completed. This is particularly the case with print data containing a lot of text and vector graphics, whereby the associated color data may assume any color value from a color profile, in particular a full color profile. In addition, these data may also contain images, whereby an alteration in the image data is less often carried out, in order that the image content, people on green grass for example, is altered as little as possible. With the text or vector objects mentioned, it may be advantageous, however, to alter the color data such that a simple, fast and/or more economical processing is possible, whereby, for example, with a so-called pie-chart, the colors are adjusted such that they may be printed on a printer which does not have access to the entire color profile, whereby the various segments can be distinguished from one another. In addition, it is also conceivable that the colors encoded in the segments of the pie-chart are encoded in a color profile which is poorly suited to the printing system, for example in the color profile RGB, while the printing system is optimized for the color profile CMYK. Through an alteration of the color data in accordance with the preferred embodiment, a significant improvement in the speed of the processing, for example in the screening process or in the printer itself, may be obtained. This applies particularly to print jobs that recur regularly, whereby, in other words, much of the data, such as with form files, which are in each case identical, vary only in some texts such as billing data. The preferred embodiment makes it possible to establish the conversion rule once, and to use this again at a later time with recurring print jobs having the same form data. Recurring objects of this sort in the data stream are frequently presented for example, as resource objects in AFP print jobs, which are integrated in the data stream (inline resources) or stored externally, and referenced selectively in the print file stream (external resources). The document, or rather, print data may be encoded, in particular, in one of the AFP standards, particularly, MO: DCA or IPDS, PPML or PDF.

It is particularly possible with the preferred embodiment to identify resources of this type with a data stream parser suited for such, and to compile their color data and thereby color characteristics. The results of this compilation can then be recorded in the report, and the relevant color elements of the input color data are displayed on the display device.

The input data may be encoded particularly in one of the color profiles CMYK, RGB, LAB, OCA, HSV, Highlight Color or Indexed Color. The color conversion relevant conversion rule is specifically a mapping rule, whereby the concrete color values of the input color profile of the input data are converted to the output color profile of the output data. The color profile in which the output data is encoded may thereby, in turn, be selected from numerous given color profiles, such as the color profiles CMYK, RGB, LAB, OCA, HSV, Highlight Color or Indexed Color. Using a targeted selection of the output color profile, it is possible, for example, to intentionally incorporate or exclude a color management system from subsequent processing steps, such as a raster image processor or a printer, and thereby to intentionally further influence the end results of the printer. The results of the compilation may be summarized in a report, and displayed on the display device.

Data objects within the document file stream may be understood to be data for elements that can be graphically displayed. These may be data from vector graphics, pie-charts, segments of pie-charts, texts, barcodes or binary images, as well as more complex objects such as graphics containing several graphs and legends, i.e., vector commands, text commands and associated color values. Data objects such as PTOCA objects and GOCAs can be encoded in AFP data streams. Additional suitable resources, particularly those used and recognized in the various AFP data languages may be forms (overlays), page segments, object containers and character encodings (e.g. True Type Fonts, AFP fonts or PDF fonts). Particularly in AFP type data streams, color management resources (CMR) may be available and analyzed for the various objects these are assigned to, or rather, activated by. This information may be used in the report or the color management resources may also be altered in the course of altering the color data. In altering the values of input color data to output color data, color values may be altered. Color profiles may also be altered, however. With the preferred embodiment, color values can also be entirely deleted, which means they would be changed to black. This is particularly convenient when the output color profile is CMYK. The respective conversion may also be reversed.

For the presentation of the input color data, or rather, their color elements on the display device, it is particularly possible to select a single data object and display its color data, specifically the numerical values in the underlying color profile.

Prior to the alteration of the input color data, it is advantageous for at least one page of the document file to be previewed and displayed on the display device. This can make it easier for the operator to decide which colors need to be altered. It is furthermore advantageous to preview and display the same page after it has been altered with the output color data. It is possible for the operator thereby to directly check the results of his color conversion commands on the respective page based on the end results.

With the conversion of the input color data of objects, the document file stream may be processed for an optimal output of the document file on an output device, e.g. for a faster output on a printer or for the color optimized output on a Highlight Color printer, in that the varicolored objects or object parts, which are encoded in a full color profile (e.g. CMYK) will be reproduced in the limited full color profile Highlight Color (e.g. with only the three colors, black, red and blue) by the printer in a form recognizably different. The output may also be optimized for an output medium through the conversion of the color data, in that, for example, for an output on recycled paper or tinted paper, certain colors are altered which are similar to the color of the paper. In this manner, the contrast between the paper (background) and the object is maintained for these colors.

The display device is normally connected to a computer, which can also execute the processing of the input color data. Furthermore, a graphic user interface is displayed on which at least one portion of the document file is displayed, and the color conversion is carried out. The computer system may additionally contain familiar features such as a monitor, a keyboard, and a mouse.

A first selection function for the color profile of the output color data may be provided for each data object on the graphic user interface, as well as a selection function for the respective color value in the color profile of the output color data.

In addition to displaying the respective color profiles and associated numerical values for the input color data and the output color data, a graphic representation of the respective colors may also be displayed on the display device.

With the preferred embodiment, the possibility also exists for the user to check the color data of an inputting document file stream, and to make changes in order to obtain an optimal output, in terms of time and quality, of the document file in an output system, particularly a printer system. Furthermore, it is possible with the preferred embodiment, to provide a so-called WYSIWYG (What You See Is What You Get) editor, whereby color alterations of graphic objects may be made visible directly on the relevant document page, such that they may be checked immediately (Instant Proof).

In a further aspect of the preferred embodiment, document data which contain input color data are automatically altered in a data processing cycle using conversion rules, particularly those that have been generated according to the process possibilities described above. The data processing cycle is carried out thereby particularly for the separate processing of data for which the conversion rules are specified. The document data generated in separate data processing cycles with the output color data are outputted to a raster image processor, which screens the document file according to given screening rules, and delivers the screened document file to a printer for printing. This data processing cycle may be automated in a so-called batch mode, without any further intervention by the operator. The once established conversion rules repeated for print jobs having the same framework data (forms, resources etc.) may thereby be used, particularly in connection with the output on a specific printer. For outputting the same print job on different printers, different, printer specific sets of conversion rules may be created and used.

The conversion rules may be compiled in a chain of commands, or a list of actions, and given a title, in order that they may be called up in the automated processing by a software program which automatically processes the inputted document data with further actions for a printing output if necessary, for example with a print server.

In addition, data objects, for which color changes are to be made, may be identified in the data processing cycle using logical rules, or conditions within the document file. The positions of objects which are to be altered within a page-by-page structured document file stream can be identified thereby, using the rules and if applicable, conditions, for example, through a rule for page numbering, as well as for fixed or variable positions within the page or with contents such as a character sequence. Conditions for color conversions for the data object may be coupled with mathematical signs, in that invoice amounts are always outputted in the color "red," if they have a negative value. Thereby, other format changes that are not color based, such as a bold font, may be used. Conversion rules of this type, or parameters for the conversion rules as well can also be made available and be used in a separate companion file to the document file, in a so-called job ticket. For this, rule sets may be created once, and used for several printing cycles, e.g. with the periodic generation of invoices which are used repeatedly. Certain variations in the output results may be easily introduced through the parameters without a great deal of effort, i.e. without having to re-process the data to establish new rules.

For the displaying of the document data on the display device in the process of establishing the conversion rules, the same screening rules, in particular, may be used as those used in the raster image processor, which are used for the output of the document data to the printer. Thereby, it can be ensured that the printed image of a page corresponds exactly to the image displayed in the preview.

In the process of creating the report and/or in the process of compiling or color mapping the input color data, this data may be checked in this regard, in order to see if during the compilation of these data in subsequent processes, particularly with a printer, unfavorable system constellations occur. For example, it can be checked to see if color data in an RGB color profile, which are converted to corresponding color data in a CMYK profile, exceed a threshold value, and thereby cause an unnecessarily large, or large quantity of pigment, such as toner in an electrographic printing system or the tint of an inkjet printing system, to be used.

Furthermore, it is possible to check whether the input color data are such that in the printing process a grey scale exists, or a lightly colored grey scale. Relevant messages may be delivered to the operator, in order that he may decide on an individual basis if the corresponding target color value should be used, or if he should change them. For this, color values and color value constellation threshold values may be given, whereby it will be automatically decided, based on them, regarding alterations of the colors and/or messages.

In the process of registering the input color data and/or in the process of the color conversion, it may also be checked in particular to see if a pigment value exceeds a certain limit value, and if this is the case, to issue a warning. With toner based systems, a warning may be issued, for example, when the toner area coverage exceeds the limit value 240% for a color in the output color data.

A concept of the preferred embodiment can also be described as follows. In a preflight process for digital printing systems, color data in printing data are analyzed, and the result is presented in a report. The color data may be individually altered in terms of the color profile in which they are encoded, as well as in terms of their color values, using a graphic user interface, and the results of the alterations may be displayed using corresponding screened document pages.

Further advantages, effects and beneficial properties of the preferred embodiment may be derived from the following design versions descried in the drawings. In the various figures, the same system components will have the same reference numbers in each case.

In FIG. 1, a printing system 100 is shown, whereby print data are first transferred from a host computer 105 to a print server 110, where they are modified if needed, and the modified print data is outputted to a raster image processor 120, and is there screened and sent to a printer 130 for outputting the print data. The raster image processor 120 may be either a separate computer, or integrated in the printer 130.

Print data being input in the print server 110 are processed in a data interpretation and analysis program (so-called parsing process). In the course of the first analysis, whereby the input color data are compiled and presented in a report and displayed, the results of the parsing process are delivered to a color processing module 113, which displays the report and the color elements on the monitor 115, and using the module 113 and input means which are comprised of a keyboard and a mouse 116, the color changes are carried out by an operator with the help of a program. The rules which are generated thereby are saved in a color rule memory 114. In the course of the parsing process, process and program modules may be used, for example, which are described in US 2004/0036902 A1. This publication is referred to again at this point in regard to the present preferred embodiment.

For outputting the print data to the printer 130 or the raster image processor 120 (RIP), the print data are either cached in the print server 110, and called up before generating the color conversion rules, or the print data are outputted from the host computer 105 once again to the print server 110. The parsed print data cycle through a batch program module 112, in which the entire print data of a print job in production are fully automatically converted using the conversion rules (mapping rules) stored in the memory 114 and then outputted to the raster image processor 120.

Figure 2:
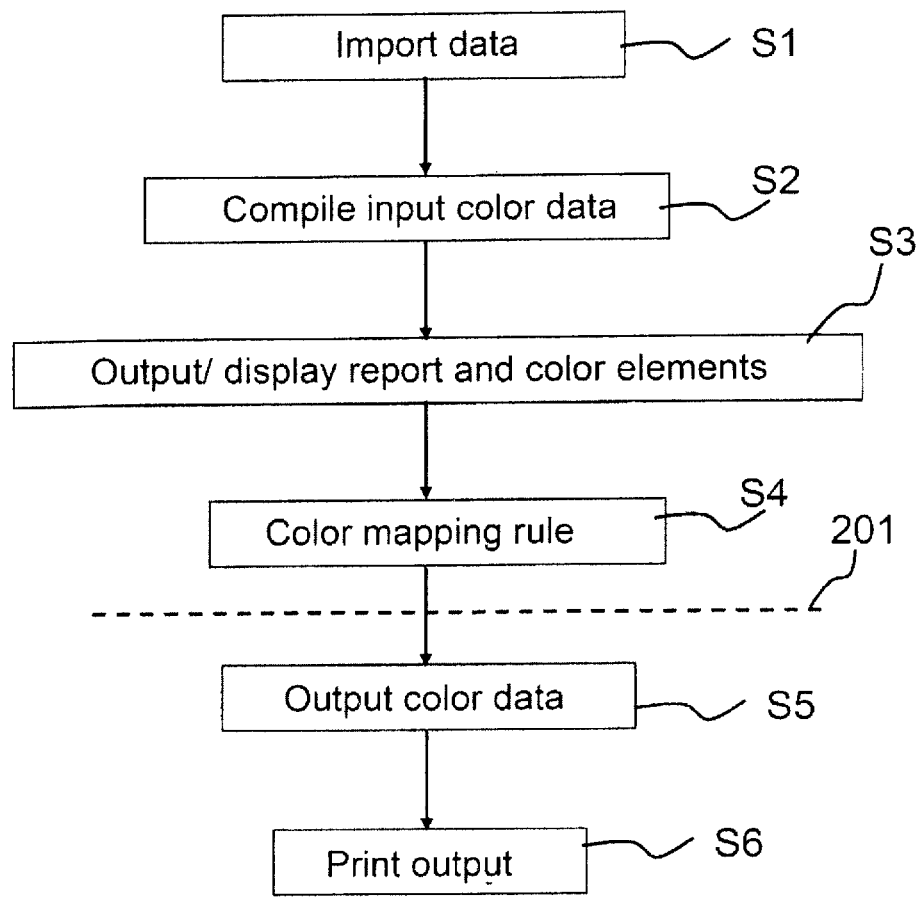
FIG. 2 illustrates a flow chart.

FIG. 2 shows some of the essential process steps which are carried out within the print server 110. In step S1, print data are entered and these are analyzed in step S2 and the input color data contained therein are compiled as objects. In step S3 a report is generated and displayed on the monitor 115, where the results of the color data compilation are contained, and corresponding color elements are graphically displayed. The report may contain, aside from color information, further analysis results, such as information regarding resources which are contained or referenced in an AFP print data stream. These may be, for example, overlay or font information. Color information and color profile information may be obtained from AFP data, particularly from the following structured fields and subfields: IID (Image Input Descriptor), GAD (Graphics Data), PTX (Presentation Text Data), BDD (Barcode Data Descriptor), 10B (Include Object), OBD (Object Area Descriptor) and PGD (Page Descriptor). The output report may be generated in a text format, such as XML, for example. For selected pages, for example the first one hundred pages of a print job, the following report content, in particular, may be included: Page number, designations of color management resources (AFP CMR resources), characteristics of all images which are contained in the pages, such as, type apeg, for example), color profile, resolution, etc., the names of all resources which are contained in the pages, and a compilation of all the colors which are used on the pages, particularly the colors from AFP, GOCA, PTOCA, BCOCA objects, as well as the presentation space and bi-level images.

In step S4, selected user specific mapping rules may be established for the input color data. These are stored in the color rule memory 114. For this, it may be specified as to which corresponding rule set is to be used, in particular, for which print job and which output printer.

The steps S1 through S4 serve as preparatory measures for a subsequent productive output of the print data with a high printing speed and are, for this reason, a component of a preflight process.

The following steps S5 and S6 may take place independently of the steps S1 through S4 at a later point in time, i.e. temporally decoupled. The temporal decoupling is symbolically represented by the separation line 201 in FIG. 2. In step S5, the output color data of a print data stream to be processed are altered in the productive process using the color mapping rules, and the thereby altered print data are outputted to the raster image processor 120 or the printer 130 in step S6.

Figure 3:
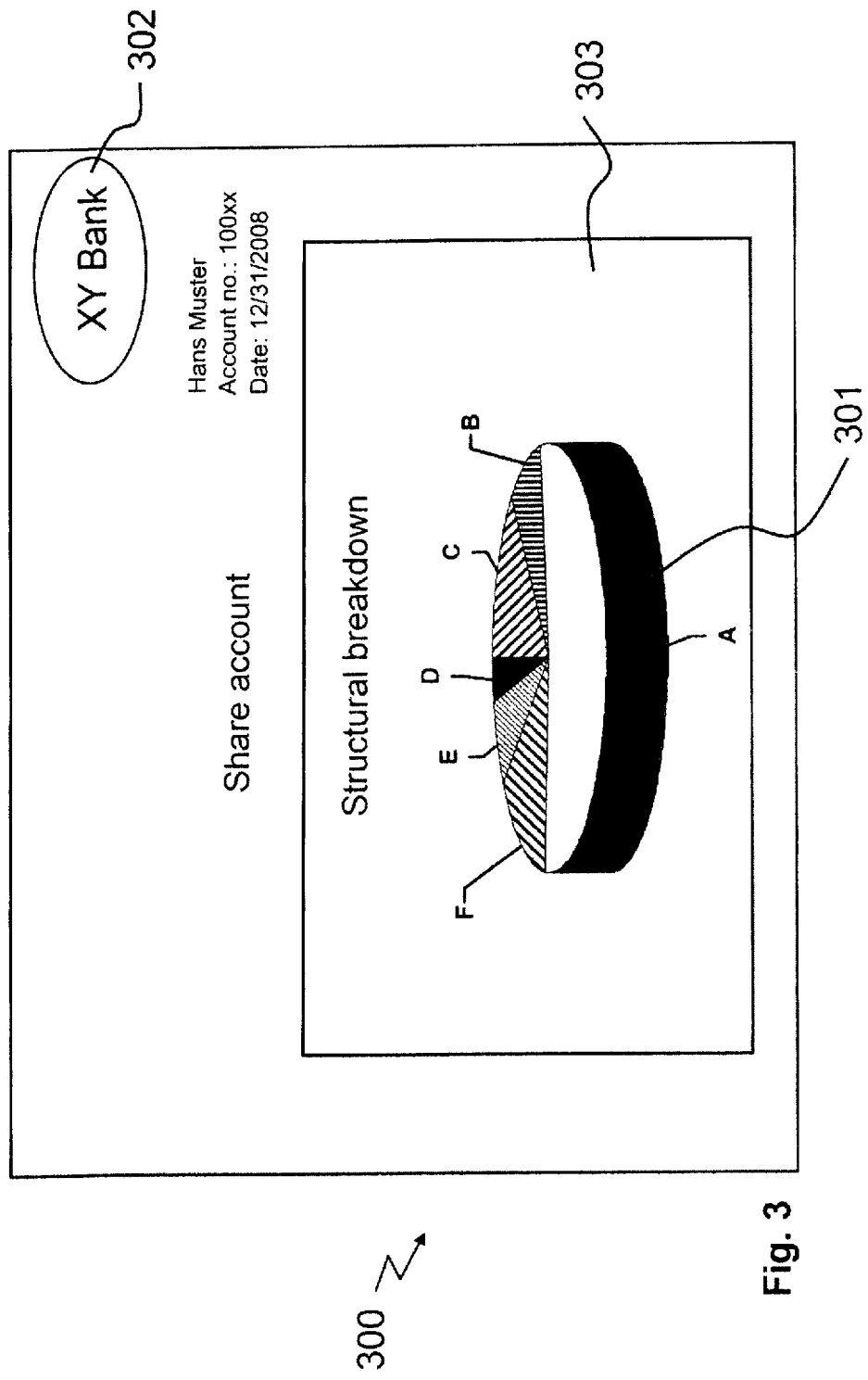
FIG. 3 illustrates the input print data corresponding to a document page.

In FIGS. 3 through 6, various windows of a graphic user interface are shown, in which color alterations are processed. In FIG. 3, a sample page 300 of a print job is represented, which in particular may be selectively displayed as a screened image on the monitor 115. In the example, it contains a bank logo 302 and a financial statement, which shows, for a share account of an individual, the structural breakdown of the respective share. The pie chart 301 has, furthermore, six segments: A, B, C, D, E, and F. Each segment is represented by a different color. The background 303 of the pie chart 301 is white, and the text is black. The monitor page shown is created through interpretation (parsing) of the respective data stream and subsequent screening in the print server.

Figure 4:
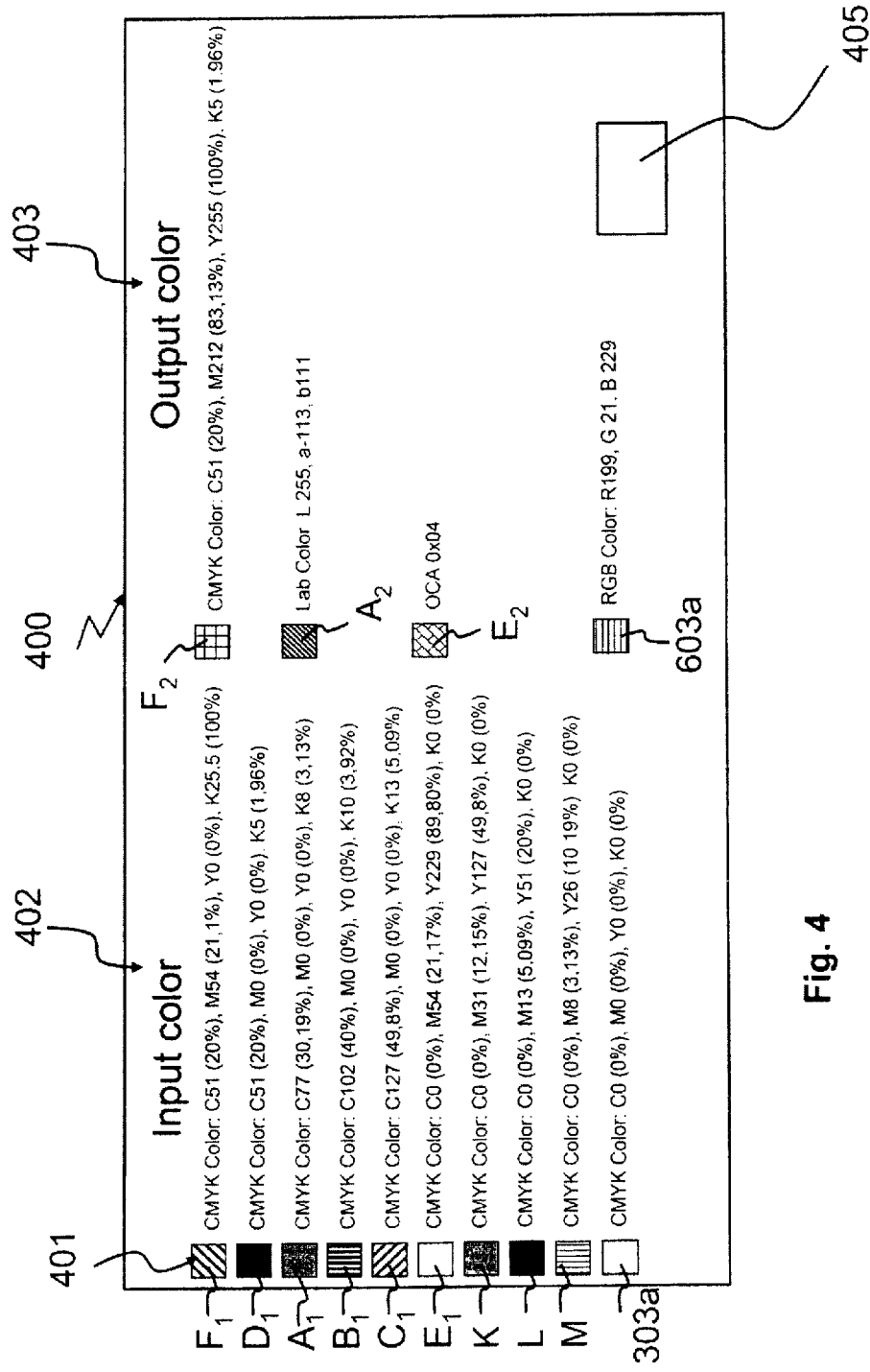
FIG. 4 is a data report.

FIG. 4 shows a tabular report 400 for color elements of the print job. It contains three columns and ten rows. Each row contains a color taken from the input data, i.e. each row corresponds to one color which occurs in one or more objects of the entire print job data.

Column 401 shows a graphic symbol of a color element for each of the respective colors. As an example, the last row contains the graphic symbol 303a (white color element) corresponding to the color white, and the CMYK color value C=M=Y=K=0 established by the analysis. This color element 303a represents the white background 303 of the pie chart 301 on the document page 300. The color elements $A_1$ through $F_1$ represent the various colors of the segments A through F of the pie chart 301 on the page 300. The color elements K, L, and M represent colors of objects on other pages of the input print data stream.

Figure 5:
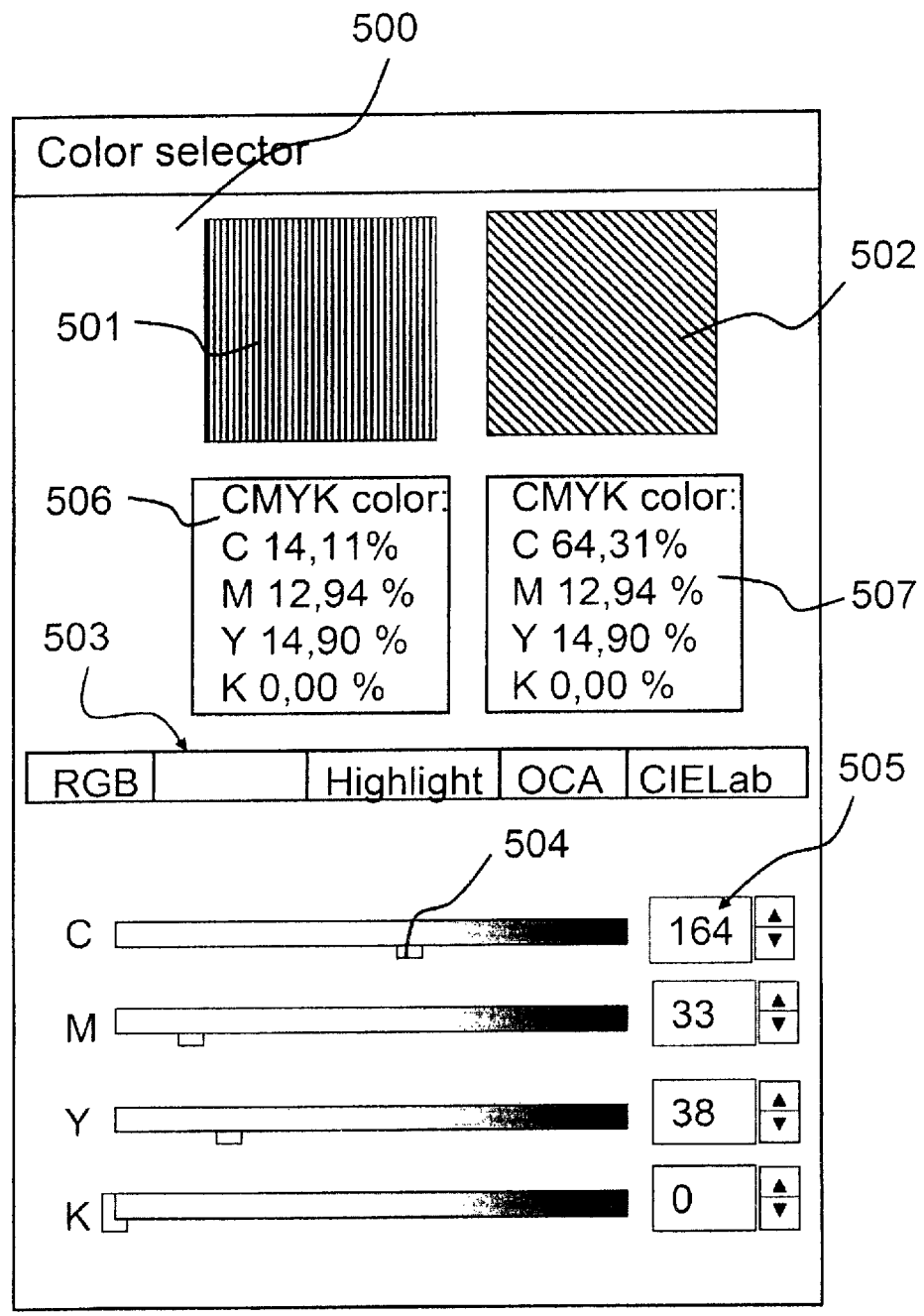
FIG. 5 shows a color editor.

The respective input color profiles as well as their input color values are listed in column 402 (input colors) whereby the values are listed numerically in bytes (i.e. in the region between 0 and 256) and displayed as percentages (in relation to the byte value 256). Column 403 shows information regarding user specific output color, whereby the user, by using the editing button, with a mouse, for example, can assign the respective input colors to their respective lines, i.e. map the input colors individually, and generate a corresponding mapping rule. After marking the respective input color element or the corresponding report line, and clicking on the editing button 405, the editing window 500 shown in FIG. 5 is opened. This will then graphically display the input color element 501 for an input color, as well as an output color element 502 for the output color selected by the user. In the areas 506 and 507 shown below this, in each case numeric values and the determined color profiles—the color profile CMYK in each case—are displayed for the colors of the two color elements 501 and 502.

With a color profile rider 503, the user determines in which color profile (in this case, RGB, CMYK, Highlight Color, OCA or CIE Lab) the output color values should be encoded. With color value regulators 405, an arbitrary value between 0 and 255 may be assigned to each coordinate in the color profile (CMYK), and thereby an arbitrary mapping rule may be established between the input color value and the output color value. Each of the values is represented in the color value display 505, and can be directly altered there, by the user, by entering the numerical value, for example, with a keyboard. The color conversions or color assignments which have been executed are stored in the memory 114 (FIG. 1).

The output color column 403 in FIG. 4 shows examples of the respective altered output color elements $A_2$, $E_2$, $F_2$ and 603a for each of the various input color elements $A_1$, $E_1$, $F_1$ and 303a, indicating the executed color mapping.

Figure 6:
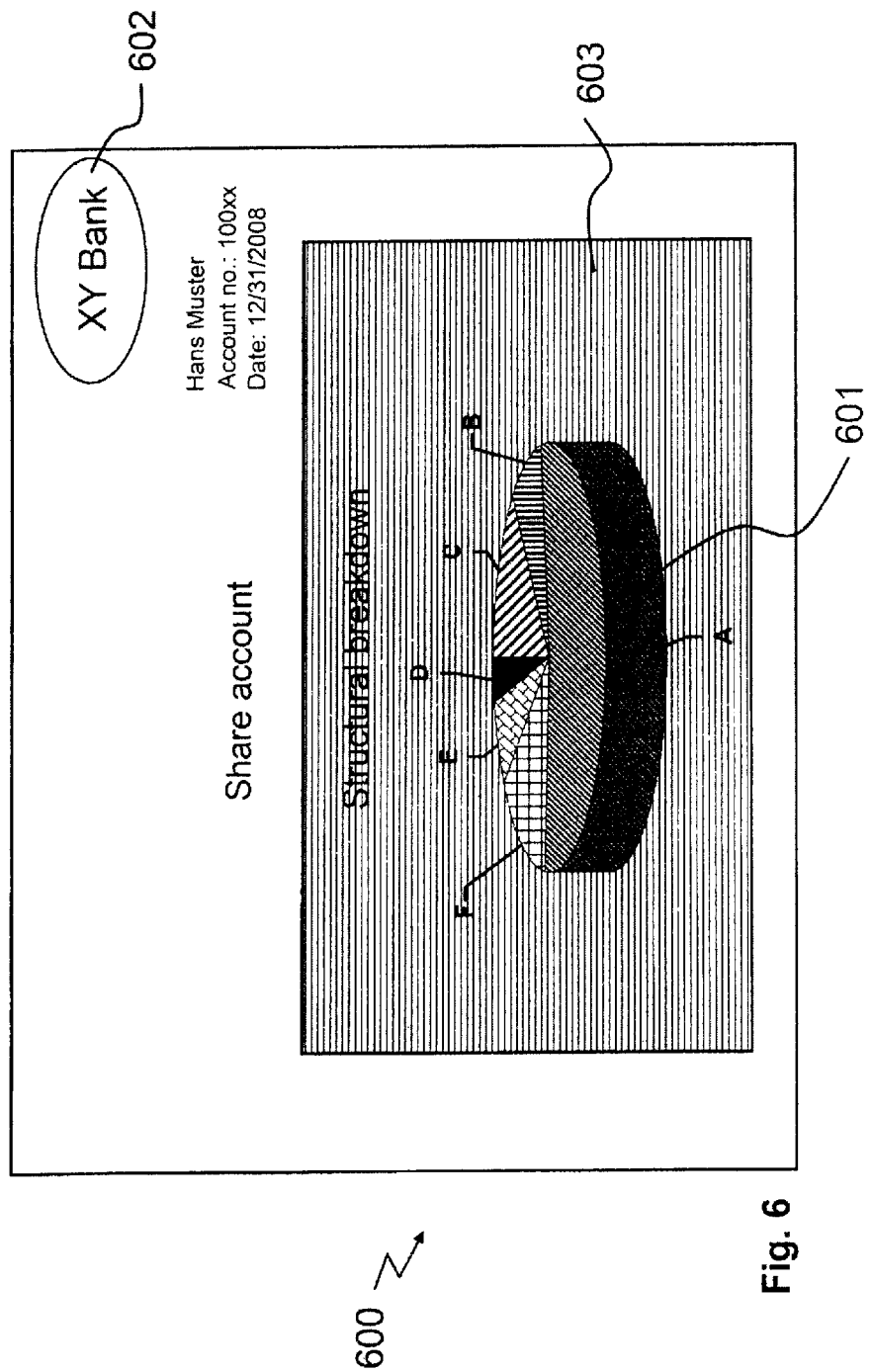
FIG. 6 illustrates the output print data corresponding to a document page.

FIG. 6 shows an example of how the document page 300 of FIG. 3 would look, when the color values have been respectively altered individually in accordance with the color mapping determined in FIG. 4. The text and bank logo 602 remain unchanged in terms of color here (black). The shape of the pie chart 601 and the colors of the segments B, C, and D remain unchanged with respect to the pie chart 301 of FIG. 3, while the colors of the segments A, E and F however are changed, in correspondence to the mapping rules established in FIG. 4, whereby A (A$_1$->A$_2$), E (E$_1$->E$_2$) and F (F$_1$->F$_2$). The background 603 of the pie chart is significantly altered from the white background 303 of page 300 (FIG. 3), in that a darker color (color element 603a) is used.

For visual control of the alterations, the data of the print page 300 are re-screened using the mapping rules from FIG. 4, or respectively FIG. 5, whereby the data for print page 600 are generated and the page 600 is displayed. It is thereby beneficial to display the two pages 300 and 600 next to each other on the monitor 115, or using a second monitor so that each of the pages 300 and 600 are displayed on an individual monitor, whereby both are displayed simultaneously.

The preferred embodiment is described using examples. It is thereby clear that an expert in the field could easily find and present variations. As an example, it could be advantageous to expand the report 400 in FIG. 4 with additional information details regarding the respective data objects using a direct or indirect link. Furthermore, it is possible to, instead of determining color conversions through the report shown in FIG. 4, to execute it directly on a displayed page, for example on the bank logo 302 or the segment A of the pie chart 301, with a mouse click on the object displaying a color value, and to assign a new color to this object directly, using the settings menu shown in FIG. 5. Furthermore, a choice for the user may be incorporated, as to whether the automatic processing of the print job should treat all objects having the same color properties with the same mapping rules, or only selective objects from specific positions, i.e. pages or regions within a page, should be treated according to the mapping rules. In the examples shown, all processes for color mapping are carried out in the print server. At least a portion of the processes may be carried out however on a separate computer which may be connected to the print server through a network, but this is not necessary.

The preferred embodiment is particularly suited to be realized as a computer program (software). It can be processed as a computer program module in the form of a file on a data medium such as a CD or DVD ROM, or as a file from a data or communication network. This type, or similar computer program products or computer program elements, are components of the preferred embodiment. The process of the preferred embodiment may be used with a computer, a printer or a print system having either upstream or downstream data processing devices. It is clear thereby that the respective computer on which the preferred embodiment is to be used, furthermore may contain familiar technical components such as, for example, a microprocessor, a data or control bus, as well as RAM, a hard disk and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A process for processing document data containing many document pages, wherein color data are contained in the document data, the color data being encoded in a color profile and designated as input color data, comprising the steps of:
providing logical rules or conditions for identifying positions of objects whose respective colors are to be altered, and using said logical rules or conditions, identifying said objects;
displaying said objects by displaying respective color elements of the input color data on a display device;
for said displayed objects executing a color conversion and generating a conversion rule therefore to change each of said displayed objects of identified position to different colors than their original colors, said different colors all being different from each other;
altering respective color elements of the input color data in the document data for said objects according to the conversion rule, and generating output color data thereby;
selecting a color profile in which the output color data are to be encoded from several provided color profiles; and
screening at least a portion of the document data on a page-by-page basis with the output color data, and displaying the screened data on the display device.

2. The process of claim 1 wherein the input color data are encoded in one of the color profiles CMYK, RGB, LAB, OCA, HSV, Highlight Color or Indexed Color.

3. The process of claim 1 wherein at least two of the color profiles CMYK, RGB, LAB, OCA, HSV, Highlight Color or Indexed Color are available for the encoding of the output color data.

4. The process of claim 1 wherein results of a compilation are presented in a report and the report is displayed on the display device.

5. The process of claim 1 wherein the document data are encoded in a print data language.

6. The process of claim 1 wherein for said displayed objects, in each case a selection function for the color profile of the output data and a selection function for a respective color value of the output color data is available in a graphic user interface of a computer.

7. The process of claim 1 wherein for said displayed objects of the document data stream, a corresponding color profile and corresponding color values for both the input color data and the output color data, as well as a graphic representation of the respective colors, are displayed on the graphic user interface.

8. The process in accordance with claim 1 wherein the entire document data with input color data are automatically converted in a separate data processing cycle using mapping rules, and the document data with the output color data generated thereby are sent to a raster image processor which screens the document data according to given screening rules, and sends the screened document data to a printer for printing.

9. The process in accordance with claim 8 wherein for the screening in order to display the document data on the display device, same screening rules are used as those used in the raster image processor.

10. The processing in accordance with claim 1 wherein the color profile of the input color data is CMYK or RGB, and the color profile of the output color data is Highlight Color.

11. A print system for processing document data containing many document pages, comprising:
color data contained in the document data, the color data being encoded in a color profile and designated as input color data;
a computer having a non-transitory computer-readable medium comprising a computer program; and
said computer program performing the steps of
providing logical rules or conditions for identifying positions of objects whose respective colors are to be altered, and using said logical rules or conditions, identifying said objects;
displaying said objects by displaying respective color elements of the input color data on a display device;

for said displayed objects executing a color conversion and generating a conversion rule therefore to change each of said displayed objects of identified position to different colors than their original colors, said different colors all being different from each other;

altering respective color elements of the input color data in the document data for said objects according to the conversion rule, and generating output color data thereby;

selecting a color profile in which the output color data are to be encoded from several provided color profiles; and screening at least a portion of the document data on a page-by-page basis with the output color data, and displaying the screened data on the display device.

12. A non-transitory computer-readable medium comprising a computer program for processing document data containing many document pages wherein color data are contained in the document data, the color data being encoded in a color profile and subsequently designated as input color data, said program performing the steps of:

providing logical rules or conditions for identifying positions of objects whose respective colors are to be altered, and using said logical rules or conditions, identifying said objects;

displaying said objects by displaying respective color elements of the input color data on a display device;

for said displayed objects executing a color conversion and generating a conversion rule therefore to change each of said displayed objects of identified position to different colors than their original colors, said different colors all being different from each other;

altering respective color elements of the input color data in the document data for said objects according to the conversion rule, and generating output color data thereby;

selecting a color profile in which the output color data are to be encoded from several provided color profiles; and screening at least a portion of the document data on a page-by-page basis with the output color data, and displaying the screened data on the display device.

* * * * *